L. P. HARRIS.

Evaporating-Pan.

No. 1,464

Reissued Apr. 28, 1863

Witnesses
Robt W Fenwick
D C Lawrence

Inventor
Lyman P Harris

N. PETERS, PHOTO-LITHOGRAPHER, WASHINGTON, D. C.

UNITED STATES PATENT OFFICE.

LYMAN P. HARRIS, OF MANSFIELD, OHIO.

IMPROVEMENT IN APPARATUS FOR EVAPORATING SACCHARINE JUICES.

Specification forming part of Letters Patent No. 22,648, dated January 18, 1859; Reissue No. 1,164, dated April 28, 1863.

*To all whom it may concern:*

Be it known that I, LYMAN P. HARRIS, of Mansfield, in the county of Richland and State of Ohio, have invented certain new and useful Improvements in Apparatus for Defecating and Evaporating Sugar and Sirup Juices Obtained from Cane and other Plants; and I do hereby declare that the following is a full, clear, and exact description of the same, reference being had to the accompanying drawings, forming part of this specification, in which—

Figure 1:
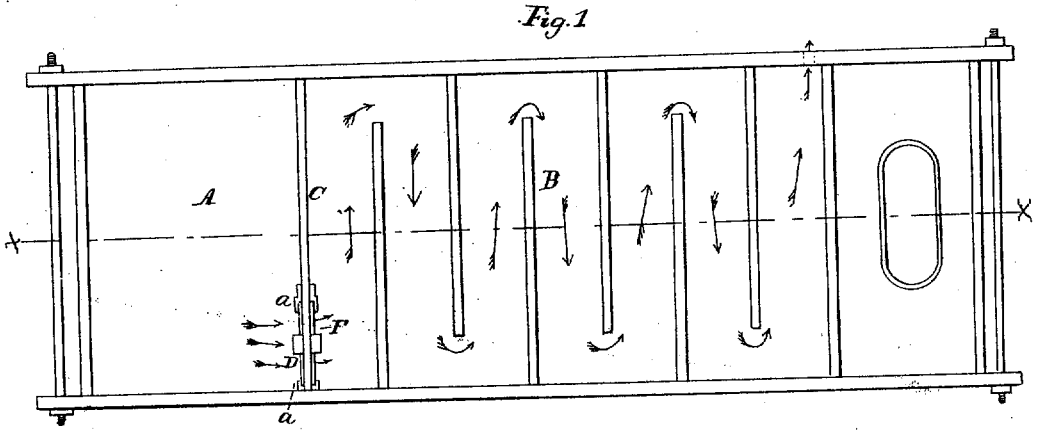
Figure 2:
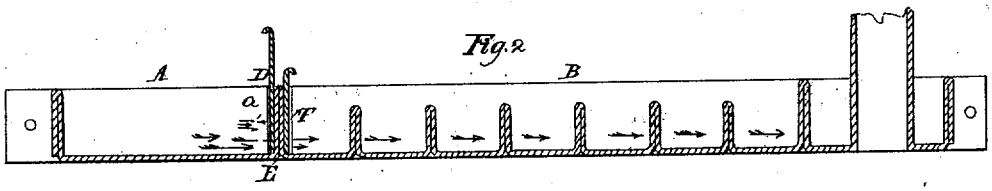
Figure 3:
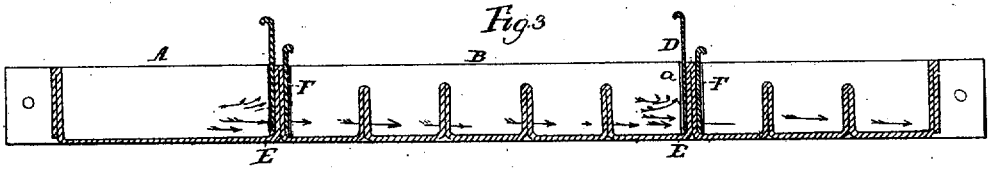

Figure 1 is a plan or top view of an evaporating and defecating apparatus embodying my invention. Fig. 2 is a vertical longitudinal section of the same. Fig. 3 is also a longitudinal section of an evaporator and defecator having two high ledges and two points at which the under or bottom surface-current is employed in connection with a flowing body of juice.

Similar letters of reference in the several figures indicate corresponding parts.

The nature of my invention consists in arresting the green matter or chlorophyl thrown off by the action of heat from sugar-cane juice and the juices of other similar plants during the process of defecation by means of a partition of a shallow evaporating-pan, such partition having a space between a greater or a less portion of its lower edge and the surface-bottom of the pan through which the under purified or defecated stratum of juice has a chance to flow freely directly upon and over the surface-bottom of a shallow evaporating-pan, the flowing juice not being separated into two distinct bodies, but that in the defecator being connected with that in the evaporator by a thin sheet or stream, which stream has parted with its chlorophyl, the chlorophyl having risen from it to the top surface of the juice in the defecator and been arrested by the upper part of the partition, or skimmed off by the manager of the apparatus.

My invention further consists in the application of an adjustable gate to an evaporating and defecating pan, which arrests the chlorophyl of the defecating-apartment and allows an underflow from the defecator directly upon the surface of the pan or evaporating-apartment, so that the flow of the purified or defecated juice may be regulated or cut off.

My invention consists, further, in the application of a strainer to any evaporator which has partitions and operates with a flowing stream of juice, so that any floating feculencies or green matter that follow the under stream or current may be arrested while the flow of juice continues.

My invention consists, further, in two or more high ledges, each of which is provided with an under-surface-flow space immediately between its lower edge and the surface-bottom of the pan or evaporator, in connection with shallow evaporating-pans of all known constructions, so that the operation of arresting feculencies and all foreign matter may be repeated as the defecation and evaporation progresses.

My invention consists, further, in the application of the before-mentioned gate and strainer, separately or together, to every additional ledge, which has the under-flow passage between its lower edge and the surface-bottom of the pan, for a like purpose to that stated heretofore.

My invention consists, further, in the combination of a high ledge and a gate or a strainer with that portion of the pan which is known as the "evaporator" in contradistinction to the defecator-apartment.

The necessity for my invention grows out of the fact that in our northern climates the seasons are such that the Chinese sugar-cane or sorghum seldom reaches a high degree of maturity before it becomes necessary to harvest it—often in an immatured state—and in consequence thereof, and the immediate necessity, in order to save it, of grinding before frosts, the pressure to which the stalk is submitted while in this tender condition in removing the juice causes the removal of a large quantity of the chlorophyl and other vegetable matter from the stalk along with the juice. Now, this foreign matter must be thoroughly removed from the juice during the process of heating and evaporating, otherwise the sirup and sugar will be of a very inferior quality. The application of heat to a shallow body of juice readily coagulates these foreign substances, and a rising to the surface of the juice of the same immediately follows, and skimming off of the scum thus thrown up should be promptly performed preparatory to rapid evaporation. Therefore an apartment conveniently arranged for properly heating and defecating the juice prior to its flowing upon the evaporating-surface, and also affording convenience for immediate flow by an under current upon the pan-bottom of a thin stream of juice, is an essential feature in an evaporating apparatus.

My experiments in the use of shallow defecators and evaporators have been very satisfactory, showing their great superiority over deep vessels used for the same purpose. By this method of defecating and evaporating I have produced bright sirup of superior quality and fine flavor, which readily granulates, producing sugar of good quality. Such results are obtained with great difficulty when the juice is defecated and evaporated in deep bodies.

To enable others skilled in the art to make and use my invention, I will proceed to describe the same with reference to the drawings.

A, Figs. 1 and 2, is the defecating-apartment of the apparatus; B, the evaporating-apartment.

My apparatus is an elongated rectangular vessel adapted to set upon any style of fire-furnace. The bottom of the vessel is flat, and its ends and sides extend up therefrom only a short distance—say about four or five inches. Metal which is indestructible under the influence of acids to a great degree may be used in constructing the bottom and ends of the pan. Wood is preferable for the sides. This description may be varied from according to circumstances and the capacity required for the apparatus, and it is only given as a good way of constructing a pan, it forming no part of my invention, except by way of connection with the following:

C is a transverse ledge or partition, extending up from the bottom of the pan to the upper edge of the sides thereof. This partition attaches to the sides of the pan. It is located so as to cut off about one-third of the length of the pan at the forward end, and thus form the two compartments A B, the evaporating-compartment B occupying about two-thirds of the whole length of the pan. The whole bottom surface of the two compartments forms one horizontal or nearly horizontal plane. The proportions and the details of construction may be varied; but I always prefer to have a far greater length of evaporating-surface than there is defecating-surface.

In order to obtain a communication, E, below the surface of the body of juice between the two compartments and directly upon the surface-bottom, I cut a portion of metal from the under edge of the partition C, the depth of cut extending high enough to allow a stream of the desired depth to flow into the evaporator, but not so deep as to allow the juice of the full depth of body in the defecator to flow at one time into the evaporator-apartment. The communication, however, may extend from bottom to top of ledge C; but in that case, as also in the plan just previously described, I would provide my adjustable gate D, and fit the same in guides *a a* on opposite sides of the passage E, as represented, so that the depth may be varied to suit the different heats of the furnace or the fancy of the manager of the process.

The adjustable gate operates the same as though one part of the ledge had been cut out, again replaced, and made to lift up from contact with the bottom of the pan. It is the flowing stream or current below the scum-surface that I have long been seeking to render practicable, and that I have attained only successfully by having no obstruction between the bottom of the pans and that part of the ledge under which the juice flows, and even with this plan of arrested scum or top current, and of flowing clear juice under current, a further precaution is necessary in some kinds of sugar and sirup juices in order to exclude the floating particles of chlorophyl and vegetable matter from the evaporating-apartment—that is, to place a fine strainer, F, (which is removable so as to be cleansed,) behind or opposite the space E, as represented. Such strainer allows the juice to flow, but retains the foreign substances in the defecator-apartment.

The evaporator-apartment may be divided up into separate transverse channels, so as to have the juice flow in a zigzag line, as represented in Fig. 1; or my invention may be applied to the whole series of partitions, or to one, two, or more, at intervals, as desired.

The manner of arranging the partitions, and the number of partitions, is not the invention I am patenting. This may in various ways have been contrived by others previous and subsequent to my patent; but the use of a gate-valve in one or more of the partitions, and also the use of a strainer on one or more of the partitions, however the partitions are arranged, and the flowing of the juice under one or more partitions, constitute the gist of my invention.

I have shown in Fig. 3 two high ledges and a series of lower ledges, the high ledges each having a gate and strainer located at the center of the pan. The low ledges are arranged the same as shown in Fig. 1. This arrangement does the same work as plan Fig. 1, with the additional work of separating or arresting any new feculencies that may be developed in the juice while undergoing the evaporating process.

The leading object of high ledges in a pan is to prevent an overflow from one channel or apartment to another.

What I claim as my invention, and desire to secure by Letters Patent, is—

1. An evaporating-pan which allows of a bottom-surface flow of the juice and stops a top-surface flow, substantially as and for the purposes set forth.

2. A high ledge between the defecator and evaporator, for the purpose set forth.

3. The application of an adjustable gate to an evaporating and defecating apparatus, substantially as and for the purpose set forth.

4. The application of a strainer to an evaporator, substantially as and for the purpose set forth.

5. The combination of two or more high ledges, each of which is constructed with an under-surface-flow space, in connection with shallow evaporating-pans, substantially as and for the purpose set forth.

6. The application of a gate or a strainer to each additional ledge which has the underflow passage, substantially as and for the purpose described.

7. The combination of a high ledge and a gate or a strainer with that portion of the pan known as the "evaporator," substantially as and for the purpose set forth.

LYMAN P. HARRIS.

Witnesses:
ROBT. W. FENWICK,
CHAS. MASON.